3,332,981
UREA STILBENE BRIGHTENERS
Webster A. Shultis, Jr., Castleton, and Orville G. Shanholtzer, Nassau, N.Y., assignors to General Aniline & Film Corporation, New York, N.Y., a corporation of Delaware
No Drawing. Filed Sept. 14, 1964, Ser. No. 396,390
7 Claims. (Cl. 260—465)

This invention relates to a new class of urea stilbene brightener compounds which are useful as fluorescent brightening agents.

There is a great need for an inexpensive nylon brightener, especially one which can be used in the home laundry. To be commercially feasible the brightener must be inexpensive, it must have sufficient dye strength to brighten the fabric economically and satisfactorily, the shade of fluorescence must be pleasing to the eye, the product should be colorless or nearly colorless so as not to discolor the material, and on exposure should not gray the material. Available nylon brighteners suffer the above defects to a greater or less extent.

We have found a new class of urea stilbene brightener compounds which are readily and inexpensively manufactured and which have manifold advantages in that they have sufficient build-up on nylon to impart a good brightener effect of a pleasing shade and on exposure to light do not gray the material and have only a slight coloration which is insufficient to impart any significant color to the material treated. They are very valuable in the brightening of nylon when applied either in the melt form or in the dye bath. In addition, they are useful as brightening agents for many types of materials such as cellulosic materials, synthetic materials such as polyester material exemplified by polyvinyl chloride, polyacrylonitrile, polyacrylic esters, copolymers of these, polyolefins, paraffin in the form of candles, fats and waxes and the like.

The urea stilbene brightener compounds of the present invention are readily prepared by condensing 1 mole of a suitable amino stilbene compound with an equivalent amount up to an excess of 10% of a phenylisocyanate at a temperature ranging from ambient to 75° C. either in an aqueous medium or in an inert solvent-diluent such as, for example, acetone, benzene, toluene and the like. In this connection it is to be noted that in the case where the amino-stilbene compound contains a sulfonic acid substituent the compound is sufficiently soluble that the condensation can be carried out in aqueous solution, but if a sulfonic acid substituent is not present in the aminostilbene compound it has been found that the condensation is best carried out in the inert-solvent diluent.

The urea stilbene brightener compounds prepared in accordance with the foregoing procedure are characterized by the following general formula:

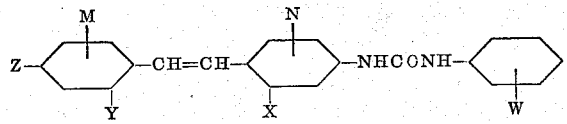

wherein W, X, Y and Z are members of the class consisting of hydrogen, chlorine, methyl, methoxy, and cyano, M and N are hydrogen or a sulfonic acid radical, at least one of M and N being hydrogen.

The amino stilbene compounds which are condensed with a phenylisocyanate compound are characterized by the following general formula:

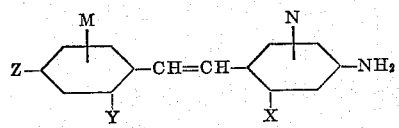

wherein X, Y, Z, M, and N have the same values as above.

As examples of amino stilbene compounds conforming to the foregoing general formula the following are illustrative:

4-aminostilbene
4-amino-2-chlorostilbene
4-amino-2'-chlorostilbene
4-amino-4'-chlorostilbene
4-amino-2,2'-dichlorostilbene
4-amino-2,4'-dichlorostilbene
4-amino-2',4'-dichlorostilbene
4-amino-2'-methylstilbene
4-amino-2',4'-dimethylstilbene
4-amino-2-methoxystilbene
4-amino-2'-methoxystilbene
4-amino-4'-methoxystilbene
4-amino-2'-methyl-4'-methoxystilbene
4-amino-2-cyanostilbene
4-amino-2-chloro-3-stilbenesulfonic acid
4-amino-2'-chloro-3-stilbenesulfonic acid
4-amino-2-chloro-3'-stilbenesulfonic acid
4-amino-2-chloro-4'-stilbenesulfonic acid
4-amino-2-chloro-5-stilbenesulfonic acid The phenylisocyanates which are condensed with any one of the afore illustrated amino stilbene compounds are characterized by the following general formula:

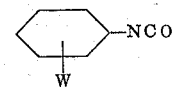

wherein W is the same as described above.

Illustrative of such phenylisocyanates the following may be mentioned:

phenylisocyanate
2-chlorophenylisocyanate
3-chlorophenylisocyanate
4-chlorophenylisocyanate
4-methylphenylisocyanate
4-methoxyphenylisocyanate The following examples, which are merely illustrative, will show preparation of the new class of urea stilbene brightener compounds and some of the applications to which they may be put.

*Example I*

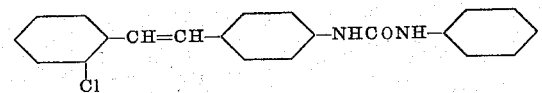

(2'-chloro-4-stilbyl) phenyl urea 22.95 grams of 4-amino-2'-chlorostilbene was added to 200 cc. of acetone. It was stirred to solution. 13.1 grams of phenylisocyanate was added slowly at room temperature. After stirring for one hour it was filtered, washed with acetone and dried. A very pale tannish product was obtained in 86% yield.

50 mg. of the compound of Example I was dissolved in 100 cc. of dimethylformamide. 5.0 cc. of this solution was added to 145 cc. of 0.1% Peregal O aqueous solution. Peregal O is a polyoxyethylene condensation surfactant. A 5 gram swatch of nylon was introduced into the dyebath and was agitated for 45 minutes at approximately 200° F. The cloth was removed, rinsed and dried. The cloth was brighter than the untreated nylon cloth.

Example II

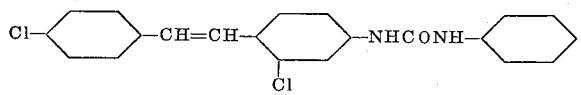

(2,4'-dichloro-4-stilbyl) phenyl urea 5.0 grams of 4-amino-2,4'-dichlorostilbene was added to 100 cc. of acetone. It was stirred to solution. 2.3 grams of phenylisocyanate was added slowly at room temperature. It was stirred 2 hours, filtered, washed with 50 cc. of acetone and dried. A pale tan product was obtained.

Nylon fabric was dyed with this brightener in the same manner as in Example I with similar results.

Example III

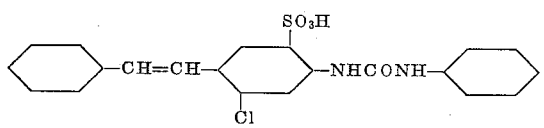

10 grams of 4-amino-2-chloro-5-sulfostilbene was stirred into 200 cc. of water. It was made alkaline to phenolphthalein by addition of sodium hydroxide. 4.0 grams of phenylisocyanate was added slowly. It was then heated to 60–65° C., stirred for 2 hours at this temperature, filtered, washed with warm water and dried. A pale tan product was obtained in excellent yield.

Nylon fabric was dyed with this brightener in the same manner as in Example I with similar results.

Example IV

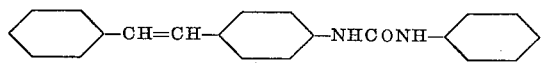

4-stilbyl phenyl urea 19.4 grams of 4-aminostilbene was added to 200 cc. of acetone. It was stirred to solution. 13.1 grams of phenylisocyanate was added slowly at room temperature. After stirring for one hour it was filtered, washed with acetone and dried. A very pale tannish product was obtained.

Nylon fabric was dyed with this brightener in the manner of Example I with similar results.

Example V

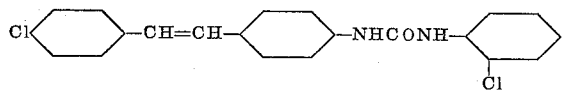

4'-chloro-4-stilbyl 2-chlorophenyl urea 22.95 grams of 4-amino-4'-chlorostilbene was added to 100 cc. of acetone. It was stirred to solution. 17 grams of 2-chlorophenylisocyanate was added slowly at room temperature. After stirring for one hour it was filtered, washed with acetone and dried. A very pale tannish product was obtained.

Nylon fabric was dyed with this brightener in the manner of Example I with similar results.

Example VI

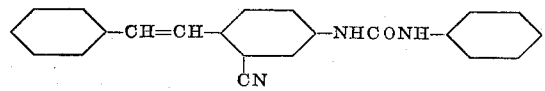

2-cyano-4-stilbyl phenyl urea 22.0 grams of 4-amino-2-cyanostilbene was added to 200 cc. of acetone. It was stirred to solution. 13.1 grams of phenylisocyanate was added slowly at room temperature. After stirring for one hour it was filtered, washed with acetone and dried. A very pale tannish product was obtained.

Nylon was dyed with this brightener in the manner of Example I with similar results.

We claim:

1. Urea-stilbene brightener compounds having the following formula:

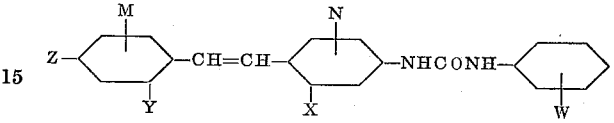

wherein W is a member selected from the group consisting of hydrogen, chloro, methyl and methoxy, X, Y and Z are members selected from the group consisting of hydrogen, chlorine, cyano, methyl and methoxy, M and N are members selected from the group consisting of hydrogen and sulfonic acid, at least one of M and N being hydrogen.

2. Urea-stilbene brightener compound having the following formula:

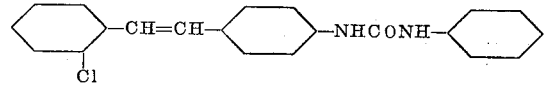

3. Urea-stilbene brightener compound having the following formula:

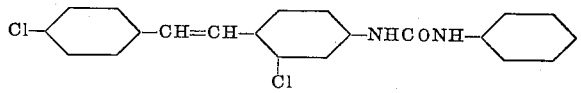

4. Urea-stilbene brightener compound having the following formula:

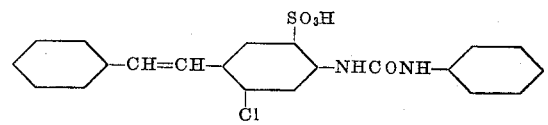

5. Urea-stilbene brightener compound having the following formula:

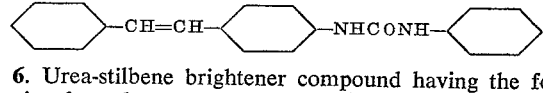

6. Urea-stilbene brightener compound having the following formula:

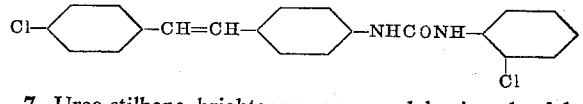

7. Urea-stilbene brightener compound having the following formula:

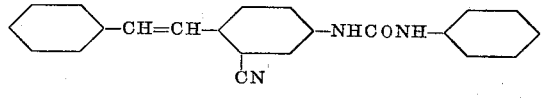

No references cited.

CHARLES B. PARKER, *Primary Examiner.*

DOLPH H. TORRENCE, *Assistant Examiner.*